US 6,750,957 B1

(12) United States Patent
Levecq et al.

(10) Patent No.: US 6,750,957 B1
(45) Date of Patent: Jun. 15, 2004

(54) METHOD AND DEVICE FOR ANALYSING A HIGHLY DYNAMIC WAVEFRONT (75) Inventors: Xavier Jean-Francois Levecq, Gif sur Yvette (FR); Samuel Henri Bucourt, Bures sur Yvette (FR)

(73) Assignee: Imagine Optic, Orsay (FR)

( * ) Notice: Subject to any disclaimer, the term of this patent is extended or adjusted under 35 U.S.C. 154(b) by 0 days.

(21) Appl. No.: 09/889,307

(22) PCT Filed: Jan. 14, 2000

(86) PCT No.: PCT/FR00/00063

§ 371 (c)(1),
(2), (4) Date: Nov. 2, 2001

(87) PCT Pub. No.: WO00/42401

PCT Pub. Date: Jul. 20, 2000

(30) Foreign Application Priority Data

Jan. 15, 1999 (FR) ............................................ 99 00366

(51) Int. Cl.$^7$ .................................................. G01J 1/00
(52) U.S. Cl. ........................................ 356/121; 356/123
(58) Field of Search ................................ 356/121, 123, 356/122, 124, 125, 614; 250/201.9; 359/849, 838, 846; 351/221

(56) References Cited

U.S. PATENT DOCUMENTS 5,233,174 A * 8/1993 Zmek ..................... 250/201.9
5,493,391 A * 2/1996 Neal et al. ................. 356/121
6,271,915 B1 * 8/2001 Frey et al. .................. 356/124
6,548,797 B1 * 4/2003 Ai ............................ 250/201.9

FOREIGN PATENT DOCUMENTS

DE 197 05 119 A1 8/1998

OTHER PUBLICATIONS

Michael C. Roggemann et al., "Algorithm to Increase the Largest Aberration that Can be Reconstructed from Hartman Sensor Measurements," *Applied Optics*, v. 37, 1998, pp. 4321–4329.

* cited by examiner

*Primary Examiner*—Russell Adams
*Assistant Examiner*—D. Ben Esplin
(74) *Attorney, Agent, or Firm*—Young & Thompson (57) ABSTRACT

A device for the analysis of an optical wavefront includes an array (ML) of microlenses ($L_i$), and signal processing elements. Each mircolens ($L_i$) defines a subaperture ($Sp_i$), and focuses an elementary surface of the wavefront, intercepted by the subaperture, for forming a spot ($T_i$) on the detector. For each subaperture ($Sp_i$), a zone ($Z_i$) of assumed localization of the spot is defined. The processing unit makes it possible to establish a measurement file associating to each subaperture the position of this spot. The structure of the array (ML) presents one or several local variations. By comparing the contribution of these local variations taken from the measurement file, with their contribution taken from a reference file, the displacement between the subaperture from which a detected spot is derived and the subaperture that defines the zone of assumed localization wherein the spot is located is measured.

13 Claims, 4 Drawing Sheets figure 1 figure 2A figure 2B figure 2C figure 2D

US 6,750,957 B1

METHOD AND DEVICE FOR ANALYSING A HIGHLY DYNAMIC WAVEFRONT

BACKGROUND OF THE INVENTION

1. Field of the Invention

The present invention relates to a method and a device for analysing an optical wavefront. It represents an improvement of the methods of wavefront analysis based on local measurement of the slope of the wavefront.

2. Description of the Related Arts

Analysis of a wavefront by local measurement of the slope (corresponding to the local derivative of the phase of the wavefront) is for example the principle of wavefront analysers called "Shack-Hartmann array" wavefront analysers. Generally they have an array of spherical microlenses and a array detector, each microlens focusing the surface element of the wavefront intercepted by the subaperture corresponding to the microlens, thus forming a light spot on the detector. The local slope of the surface element is determined from the position of the spot on the detector. Actual analysis of the wavefront surface, i.e. reconstruction of the phase of the wavefront for example on a base of polynomials, can be obtained by integration of the local measurements of the slope. Other types of analysers work on a line of the wavefront. Cylindrical microlenses arranged linearly and a detector with linear geometry are, for example, used in this case. In the same way as in the Shack-Hartmann array type, the local slopes of the wave line are measured from the positions of the spots formed by the microlenses.

SUMMARY OF THE INVENTION

Generally, the method according to the invention applies to any type of wavefront analysers based on measuring the local slope of the wavefront. The term "array of microlenses" will be used hereinafter for any set of microlenses for use in this type of analyser, it being possible to arrange the microlenses linearly or according to a two-dimensional array. Similarly, we shall talk of analysis of a "wavefront", and this analysis can relate equally to a part of the surface of the wavefront, in particular a line of the wavefront or the complete surface of the wavefront.

Figure 1:
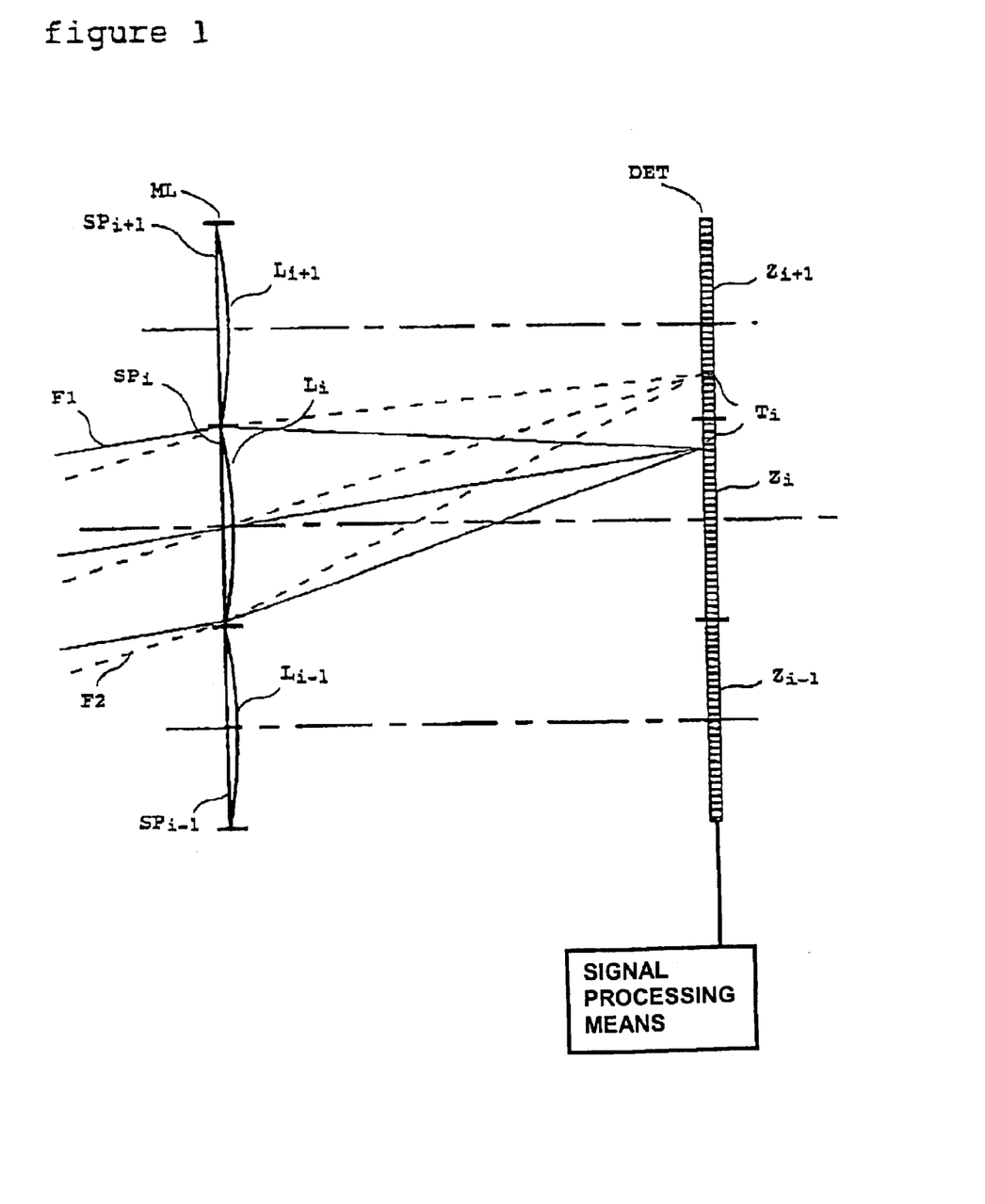
FIG. 1 (already described) shows an array of microlenses and a detector for applying an example of a method of wavefront analysis according to the prior art.

FIG. 1 shows an assembly ML of microlenses $L_i$ and a detector DET for implementing a method of wavefront analysis as described above. When a wavefront $F_1$ enters the system, each microlens forms a spot $T_i$ on the detector. To determine the position of the spots, generally it is assumed that a spot $T_i$ formed by a given microlens $L_i$ is within an assumed localization zone $Z_i$. This localization zone is for example defined by the projection on detector DET of the subaperture $SP_i$ corresponding to the microlens $L_i$, as shown in FIG. 1. This assumption offers the advantage of considerably simplifying the circuit for localization of the spots, thus making the system faster. Sometimes the structure of the array of microlenses is not perfect and may have local defects, for example defects in arrangement of the microlenses or defects relating to the size of one microlens relative to another. This introduces an error in the position of the spot formed. To overcome this type of problem, generally the positions of the spots formed from a reference beam that is known perfectly are subtracted from the positions of the spots formed from the wavefront to be analysed. Of course, to avoid introducing any error during this operation, it is necessary for the positions of the two spots formed by the same microlens to be subtracted from one another. If it is assumed a priori that a spot detected in a given localization zone has come from the subaperture that defines this zone, there is a risk of introducing an error during the subtraction operation when a wavefront has a considerable deflection, for example. Thus, as can be seen for example in FIG. 1, if a wavefront $F_2$ has considerable deflection, the spot $T_i$ formed by lens $L_i$ is within the assumed localization zone $Z_{i+1}$ corresponding to lens $L_{i+1}$. There is a displacement of a subaperture (in the chosen example) between the subaperture $SP_i$ from which spot $T_i$ originates and the subaperture $Sp_{i+1}$ defining the localization zone $Z_{i+1}$ in which the spot $T_i$ is actually located.

Of course, we always try to obtain perfect arrays of microlenses and the technology is advancing in this direction. However, the problem of knowing with certainty the correspondence between a detected spot and the subaperture from which it originated always arises, for example when we require exact measurement of the deflection using a device that is required to have a wide dynamic range, i.e. a device capable of analysing wavefronts possessing large deflections, among other things. In this case, to know this correspondence with certainty, it is necessary to be able to measure the displacement between the subaperture from which the spot originated and the subaperture that defines the assumed localization zone in which the spot is located.

A solution has been proposed in this direction by the company Adaptive Optics Associates (AOA, Cambridge, Mass.). This solution, applied to a wavefront analyser of the Shack-Hartmann array type, is explained in the article "Hartmann sensors detect optical fabrication errors" (LASER FOCUS WORLD, April 1996). It consists, in the course of measurement, of bringing the detector of the array of microlenses closer, in such a way that, regardless of the local slope of the wavefront being analysed, all the flux collected by a subaperture is located totally within the assumed localization zone defined by this subaperture. Then the detector is moved farther away from the array of microlenses as far as its normal working position while following the position of the spot. It is thus possible to detect whether it changes zone. This solution has some drawbacks. In particular, it necessitates movement of the detector, which involves mechanical constraints in the system and the risk of introducing an error in the measurement, because of possible deflection of the detector, or poor axial repositioning during movement. Furthermore, this calibration operation must be repeated for each analysis of a new wavefront. And even in the course of analysis of a wavefront, since the correspondence between a spot and the microlens from which it originated is determined by following the position of this spot, if this position is lost (for example because the flux is cut off momentarily), the correspondence is no longer certain and recalibration becomes necessary.

To overcome these drawbacks, the present invention proposes another solution permitting exact measurement of the parameters of the wavefront and in particular of its deflection. It consists of choosing an array of microlenses having one or more local variations of its structure. According to one example of implementation, each local variation can be a difference in positioning of one or of several microlenses. This variation can be an unwanted defect of the array or a local variation introduced in a controlled manner during manufacture. Comparing the positions of the spots formed starting from a wavefront to be analysed with the positions of the spots formed for example starting from a known reference wavefront, it is possible, owing to the presence of the local variation of structure which for example introduces variations in the positions of certain spots, to measure any displacement between the subaperture from which a detected spot originated and the subaperture that defines the assumed localization zone in which the spot is located.

More specifically, the invention relates to a method of wavefront analysis based on local measurement of the slope of the wavefront, the method comprising a stage of wavefront acquisition consisting of:

a stage of detection of the wavefront especially by means of an array of microlenses, a detector and means for processing the signal; each microlens defines an indexed subaperture, and focuses a surface element of the wavefront, intercepted by the said subaperture; a spot is formed on the detector which delivers a signal; an assumed localization zone of the spot on the detector is defined for each subaperture.

a stage of processing of the signal supplied by the detector, permitting establishment of a measurement file; this file associates in particular with each subaperture in the localization zone from which a spot is detected, the position of this spot, each subaperture being referenced by its index.

The method is characterized in that it further comprises:

prior choice of an array of microlenses having at least one local variation of its structure, a preliminary stage of characterization of this array making it possible to establish a reference file associating in particular with each subaperture, referenced by its index, the position of the spot that originated from the said subaperture when the subaperture is illuminated by a known wavefront, the file data including a contribution due to the local variation of the structure of the array, during each wavefront analysis, establishment of the measurement file, the file data also including a contribution due to the local variation of the structure of the array, comparison of the said contributions taken from each of the two files, this comparison making it possible to determine any displacement in number of subapertures between these two contributions and to deduce therefrom with certainty the correspondence between a detected spot and the subaperture from which it originated, knowing this correspondence, and on the basis of the measurement file and the reference file, calculating the average slope of the wavefront on each surface element intercepted by each subaperture illuminated by the wavefront.

BRIEF DESCRIPTION OF THE DRAWINGS

The method according to the invention thus makes it possible, without movement of the detector, to determine the correspondence between a detected spot and the subaperture from which it originated without having to undertake a new calibration operation for each wavefront analysis. This permits, in particular, exact measurement of the deflection of an incident wavefront and so gives the analyser a very wide dynamic range of measurement. The invention also relates to a device for wavefront analysis applying the method according to the invention. Other advantages and characteristics of the invention will become clearer on reading the description given below, illustrated by the following appended drawings, where.

DESCRIPTION OF THE PREFERRED EMBODIMENTS

The device according to the invention comprises in particular an array ML of microlenses $L_i$ (see FIG. 1), a detector DET and means (not shown) for processing the signal supplied by the detector. Each microlens $L_i$ defines a subaperture $SP_i$, indexed for example by an integer ranging from 1 to n, where n is the number of microlenses in the array. During analysis of a wavefront, each microlens $L_i$ illuminated by the wavefront focuses a surface element of the wavefront, intercepted by the subaperture $SP_i$ defined by this microlens, to form a spot $T_i$ on the detector. The processing means make it possible to process the signal supplied by the detector in order, in particular, to establish a measurement file associating, with each subaperture in the localization zone from which a spot is detected, the position of this spot. The position of each spot on the detector is determined for example by taking into account the barycentre of the spatial distribution of light energy constituting the spot. We saw earlier that the assumed localization zone (designated $Z_i$ in FIG. 1), corresponding to a subaperture $SP_i$, can be defined by the projection of the subaperture $SP_i$ on the detector DET. In this case it is independent of the incident wavefront. The localization zone can be defined differently. For example, it can be "floating"; that is, the assumed localization zone of a subaperture is defined on the basis of the position of the spot that originated from an adjacent subaperture. In this case, each localization zone has for example the same size but the position of the localization zone of each subaperture depends on the shape of the incident wavefront. According to one example of embodiment of the device according to the invention, it is assumed that these microlenses are of roughly equal dimensions and that the pitch of the array, defined by the distance between the optical centres of two adjacent microlenses, is roughly constant.

In the method according to the invention, the array ML of microlenses has at least one local variation of its structure. The structure of the array relates to the arrangement of the microlenses relative to one another as well as the inherent parameters of the microlenses: size, transmission, etc. Local variation of the structure also means, for example, a variation in positioning, size or transmission of one of the microlenses or of some adjacent microlenses. This variation may for example be an unwanted defect of the array of microlenses, a defect due to the non-reproducibility of the method of manufacture of the array. It may also be a perfectly controlled variation, introduced intentionally during manufacture. In what follows we consider the example of an array of microlenses with roughly constant pitch, with the local variation consisting of a difference in positioning of some adjacent microlenses relative to the expected position of these microlenses.

Figure 2A:
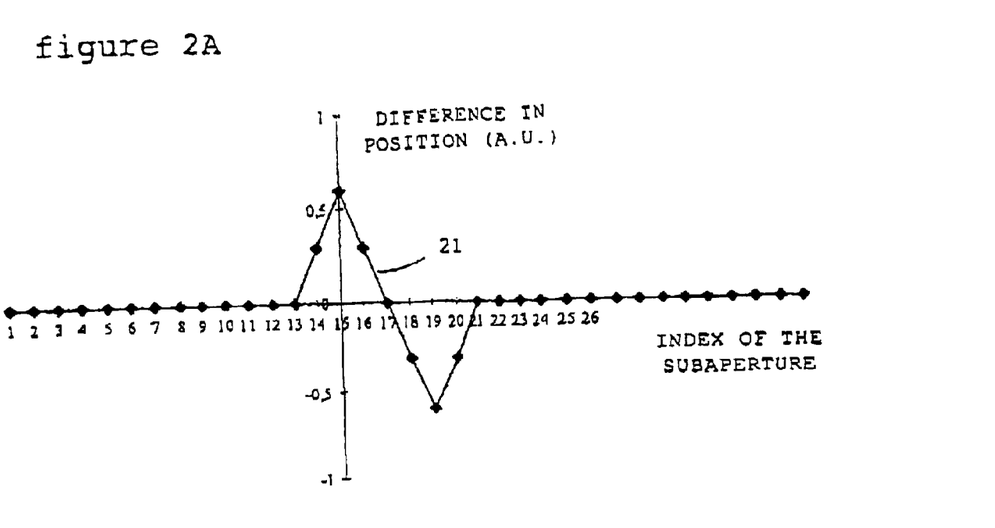
FIGS. 2A to 2D show an example of application of the method according to the invention.

In this example, a variation of the structure is reflected, during wavefront analysis, in differences on the detector, of the positions of the spots originating from the subapertures involved in this variation. In the chosen application example, we consider a local variation of the array structure introduced in a controlled manner during manufacture. FIG. 2A shows, when the array of microlenses is illuminated by a plane wavefront, an example of a distribution of the differences in positions of the spots relative to their expected positions if the pitch of the array had been perfectly constant, as a function of the index (ranging from 1 to n) of the subapertures from which the spots originated. The difference in position, given in FIG. 2A in arbitrary units (a.u.), is measured for example by a fraction of dimension of a detector element. Generally speaking, the local variation of the array used in the device according to the invention, which is reflected here by a given distribution of the differences in positions of the spots, must not be able to be interpreted during analysis of a wavefront as a component of that wavefront. In other words, the distribution of the differences in positions of the spots resulting from acquisition of the wavefront to be analysed must be distinguishable from the distribution resulting from the local variation. This is possible because to be able to be analysed correctly, an incident wavefront must have slow variations of its slope relative to the size of the subapertures, which is reflected in slow fluctuations of the distribution of the differences in positions of the spots as a function of the index of the subapertures. Thus, in the example of embodiment of the device according to the invention described here, the variation of the structure of the array must be such that it is reflected in the distribution of the differences in positions of the spots by faster fluctuations or, if reasoning in the frequency range by considering the spectral distribution of the differences, it must be reflected in frequency components higher than those due to the wavefront to be analysed. The form of distribution shown in FIG. 2A constitutes an example, and from the moment that the variation remains local, other forms of distributions are acceptable.

In the example illustrated in FIG. 2A, a single local variation of the structure is considered. Advantageously, the array can have several of them, so that even if it is not completely illuminated by the incident wavefront, at least one of these local variations would be illuminated. In this case, the set of variations must be such that it is also translated, in the spectral distribution of the differences, by frequencies higher than that of the wavefront to be analysed.

Figure 3:
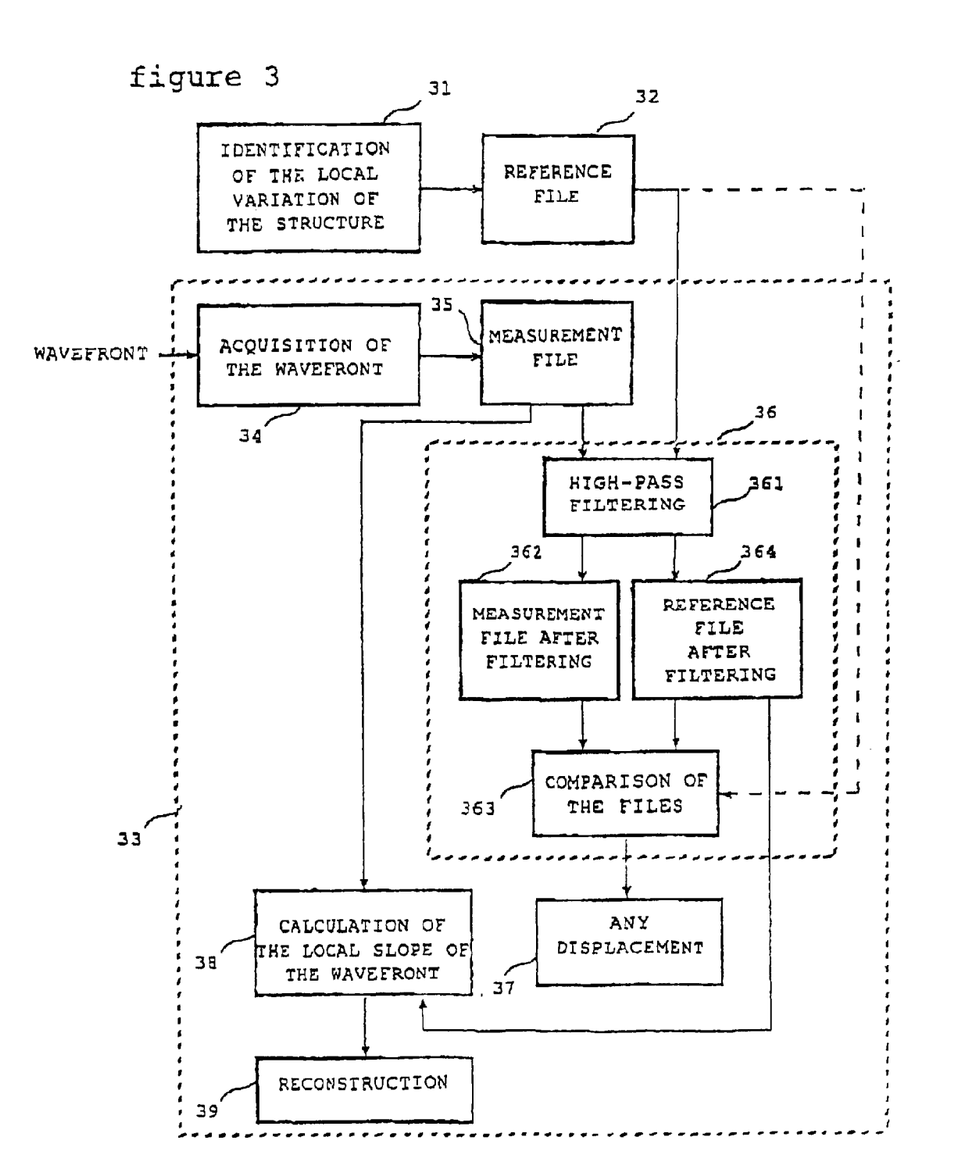
FIG. 3 gives an overview of an example of application of the method according to the invention.

FIG. 3 gives an overview of an example of application of the method according to the invention adapted to the example described above. According to the invention, the method includes, in addition to preliminary choice 30 of the array ML having at least one local variation of its structure, a stage 31 of characterization of this array ML. This stage permits establishment of a reference file (32) which, in the example chosen, associates with each subaperture, referenced by its index, the position of the spot originating from the said subaperture when the latter is illuminated by a known wavefront. The data of the reference file include a contribution due to the local variation of the structure of the array. Thus, it will be possible to know, during analysis of a wavefront, the contribution of this local variation to the positions of the spots on the detector. This stage of characterization of the array of microlenses is effected once, before or during placement of the array in the analyser and it does not have to be carried out again in the normal course of use of the analyser. It is sufficient to keep the reference file in the memory; it is this file that will be used during each wavefront analysis. Various methods are possible for characterizing the array. If the method of manufacture is perfectly controlled, in such a way that the structure of the array is known exactly and the local variations introduced into this structure are fully controlled, the reference file can be established in a theoretical manner, by calculating the position of the spot originating from each subaperture when the array is illuminated for example by a plane wavefront without deflection. As in the example in FIG. 2A, the position of the spots can be expressed as a difference of position when for example the pitch of the array of microlenses is constant. In the example in FIG. 2A, the difference in the position of each subaperture as a function of the index of the said subaperture is determined in the case when the array is illuminated by a plane wavefront, without deflection. If the manufacturing process is not perfectly controlled, it is necessary to analyse the structure of the array once it has been made. This can be carried out by any known means of characterization. Advantageously, it is possible to establish the reference file by sending a known wavefront to the analyser containing the array. This has the benefit of characterizing the array once it is arranged in the analyser. This wavefront is for example a spherical wave whose characteristics are well under control. Thus, whether the local variation is an uncontrolled defect of the structure or a variation introduced during manufacture, the reference file makes it possible to identify it. The reference file also contains the contribution of any slow variations of the structure of the array that will have to be taken into account during analysis of a wavefront.

Figure 2B:
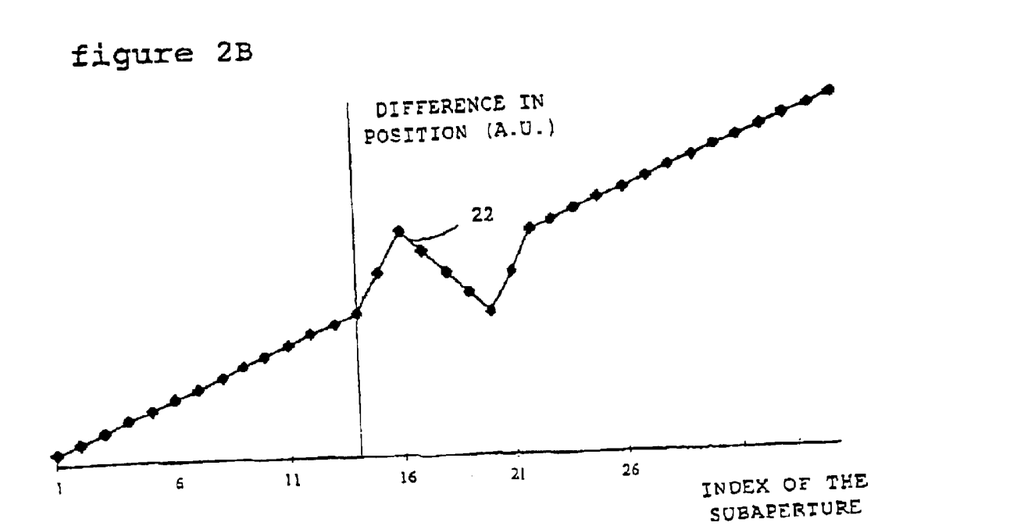

Next comes the analysis 33 of a wavefront incident on the analyser. The example chosen to illustrate the method according to the invention is that of a wavefront that has curvature and deflection. The first stage of the analysis is acquisition 34 of the wavefront. It consists of detection of the wavefront in particular by means of the array ML of the device according to the invention, then a stage of processing of the signal supplied by the detector, effected by the processing means of the device according to the invention, and making it possible to establish the measurement file designated 35. The measurement file associates, with each subaperture in the assumed localization zone from which a spot is detected, the position of that spot. The measurement file thus contains, for each one of these subapertures, referenced by its index, the position of the corresponding spot. FIG. 2B shows, in the form of a curve 22, the contents of the measurement file in the case of the example of the chosen wavefront, analysed by means of the array of microlenses characterized by the reference file illustrated by curve 21 in FIG. 2A. The curvature of the wavefront is translated by a linear distribution of the difference in the position of the spots as a function of the index of the subaperture. The deflection is translated by a constant difference in the position of each spot in the entire array. To simplify the flowchart, it is assumed that the deflection leads to a constant difference of two subapertures. Thus, curve 22 reveals the contribution due to the wavefront (curvature and deflection) to which is added the contribution due to the local variation of the structure (variations of the differences similar to those of curve 21). It is quite clear from this simple example that without local variation, curve 22 would be a straight line, characteristic of the curvature of the wavefront, but that it would not be possible to determine the exact value of the deflection, which, in this example, would be regarded as zero. Consequently, there would be an error of correspondence between a detected spot and the subaperture from which it originated; this error could falsify the calculation of the local slope of the wavefront based on the position of each spot.

In the method according to the invention, the local variation of the structure of the array makes it possible to determine the possible displacement (37) (measured as a whole number of subapertures) between the subaperture from which a detected spot originated and the subaperture that defines the assumed localization zone in which this spot is located, and deduce this correspondence with certainty therefrom by means of a comparison stage 36, in each of the two files (reference file and measurement file) of the contributions due to the local variation. Then, knowing this correspondence, on the basis of the reference file and the measurement file, it is then possible to calculate (stage 38) the average slope of the wavefront on each surface element intercepted by each subaperture illuminated by the wavefront. During this calculation, the positions of the spots recorded in the reference file for example are subtracted from those recorded in the measurement file and corresponding to the spots originating from the same subapertures, making it possible, in the analysis of the wavefront, to free oneself from the contributions due to the structure of the array. It is then possible, on the basis of measurements of local slopes, to proceed if necessary to reconstruction of the phase of the wavefront (stage 39) by known means; this stage makes it possible for example to give the classical geometric aberrations of the incident wavefront, and in particular to measure the deflection of the wavefront, it being possible for this measurement to be given exactly on account of the known value of the displacement.

Figure 2C:
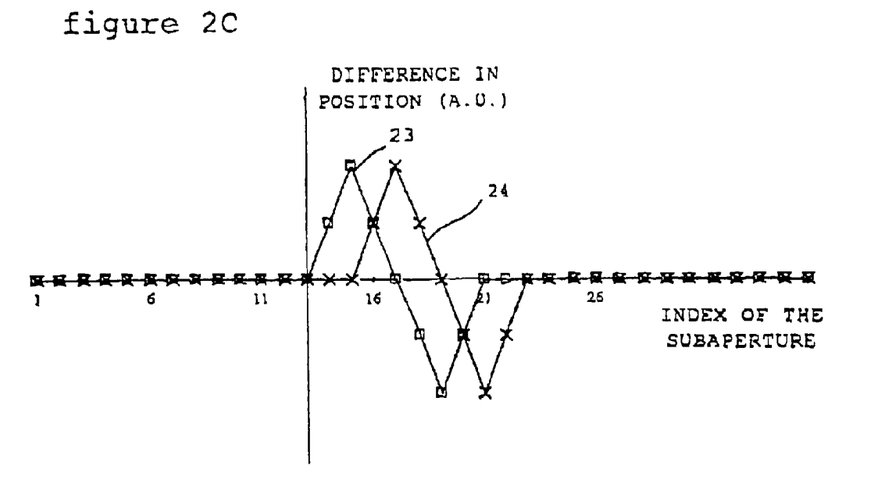
Figure 2D:
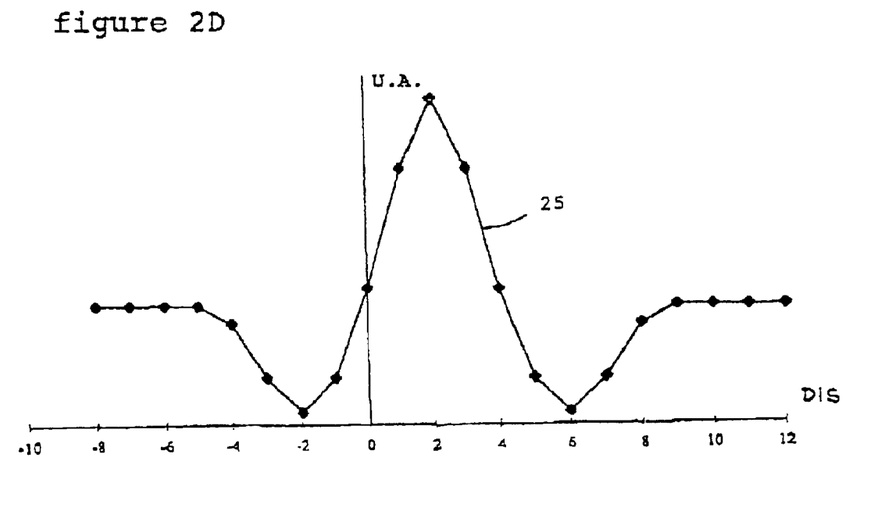

Comparison 36 of the contributions can be carried out by various methods. According to a first method, for example, an attempt will be made to compare the files with one another. It is then preferable for these files to contain only the contributions due to the local variations, i.e. high-frequency contributions, compared to the low-frequency contributions such as are due to the wavefront being analysed. It is possible to know a priori that the reference file only contains the contributions due to the local variations; either because the reference file was established directly to contain only these contributions, or because the contributions due to the known, slow variations were subtracted beforehand. We can then apply, to the measurement file (stage 361), a high-pass filter adapted to the local variations so as to keep, in the main, only the contributions due to these variations, and compare the measurement file after filtering (362) directly with the reference file. In FIG. 3, this comparison is designated 363. This comparison makes it possible to determine any displacement (365). If the reference file contains low-frequency contributions, for example if it was established by means of a known, non-plane wavefront incident on the analyser, it is also possible to apply high-pass filtering to the reference file. Advantageously, this filtering is the same, as is illustrated in FIG. 3. The comparison 363 is then made between the two files after filtering, designated 362 and 364 in FIG. 3. In the example illustrated by FIGS. 2A to 2D, the files before comparison are shown in FIG. 2C. Curve 23 corresponds to the reference file; it is the same as curve 21 in FIG. 2A because in this example, the reference file only contains the contribution due to the local variation. On the other hand, curve 24 was obtained after high-pass filtering of curve 22 in FIG. 2B; in this simple example, filtering just leads to suppression of the contribution due to the curvature. The comparison 363 can be carried out for example by an operation of correlation between the two files after filtering. The result of this operation is illustrated in the chosen example by curve 25 in FIG. 2D. This curve gives the result of correlation as a function of possible values of displacement (dis), displacement being given as the number of subapertures. It is thus a matter of calculating the function:

$$\sum_i \frac{f(i) \times g(i - dis)}{i}$$

where f(i) is for example the value of the difference in the position of the spot originating from subaperture $SP_i$ in the reference file (possibly after filtering) and g(i–dis) is the value of the difference in position of the spot originating from subaperture $SP_i$ in the measurement file after filtering to which a displacement dis has been applied. In this example, the correlation peak is found for a displacement equal to two subapertures.

The high-pass filtering 361 applied to the measurement file and/or to the reference file can be a classical filtering on files of points by selecting a cutoff frequency adapted to the local variation of the structure of the array; this frequency is for example equal to the reciprocal of the average pitch of the array multiplied by a given number N. N is then chosen large enough to preserve the contribution due to the local variation and small enough to give maximum suppression of the contribution due to the incident wavefront. Filtering can also consist, in the case of a given supporting wavefront, for example circular, and which lends itself well to splitting of the phase of the wavefront on a base of known polynomials, of subtracting from the files the contributions due to a given number of these polynomials. These may be, for example, Zernike polynomials in the classical case of wavefronts with circular support.

According to another method for comparison (36) of the contributions due to the local variation, it is not necessary to apply high-pass filtering to the one and/or to the other of the two files. For example, it is possible to apply firstly, to one of the two files, a hypothetical value of displacement, for example to the measurement file 35, then subtract the reference file 32 from the file thus obtained. Then by iteration of the value of the displacement applied, we try to find for what value of displacement the contribution due to the local variation (high-frequency) is the lowest in the file resulting from the subtraction.

Of course, other mathematical methods can be used for comparing the contributions due to the local variation of the structure in the two files, deducing the displacement from that.

Another example of local variations introduced into the structure of an array of the device according to the invention for application of the method according to the invention is described below. Knowing the general form of the frequency distribution of the positions of the spots corresponding to the incident wavefronts or, what comes to the same thing, the form of the frequency distribution of the slopes of the wavefronts, we can try to optimize the local variations to have the highest probability of determining the displacement. This optimization is undertaken by adapting this method, which can be applied for example to wavefronts with circular support for which it is known that the phase splits into a limited number of Zernike polynomials. We then look for non-cyclical local variations that give rise to a high-frequency contribution, for which a theoretical frequency distribution can be given, since the general form of the contributions of the wavefronts being analysed is known. To calculate the structure of the array that corresponds to these local variations, it is possible for example to effect a random sampling, on the set of subapertures, of the positions of the spots corresponding to each subaperture. In the frequency range, this translates into a constant distribution which is multiplied by the theoretical distribution of the local variations that are sought. By taking the inverse Fourier transform of this new distribution, we obtain new values of the differences of the spots corresponding to the subapertures. These values are given using an arbitrary unit and must then be translated in a metric scale so that this can be applied in practice to the manufacture of the array.

Throughout the foregoing, it was assumed that the local variation of the structure consisted of a difference in positioning of one or more adjacent microlenses.

It is also possible to consider a variation in size of one or more microlenses. This is also translated, in the plane of the detector, as differences in the positions of the spots originating from the subapertures corresponding to these microlenses.

However, other parameters characteristic of the microlenses can be taken for forming the local variation of the structure.

Thus, in another example of an array of microlenses for the device according to the invention, the local variation of the structure can be a variation of the transmission of one or more adjacent microlenses. In this case, the local variation is not reflected in differences of positions of spots, but in variations of luminous intensity of these spots. However, the embodiment of the method according to the invention described according to the preceding example is equally applicable. The reference and measurement files associated with each subaperture will merely need to have, in addition to the position of the spots, their intensities, and it is the contributions due to the local variation of the structure of the array in the intensities of the spots that will have to be compared (stage 36 in FIG. 3) to determine any displacement thereof (37) in number of subapertures between these contributions.

Of course, the different natures of the local variations of the structure of the array of the device according to the invention can be combined.

What is claimed is:

1. A method of analysis of a wavefront based on local measurement of the slope of the wavefront, the method comprising a stage (34) of acquisition of the wavefront consisting of:

a stage of detection of the wavefront in particular by means of an array (ML) of microlenses ($L_i$), a detector (DET) and signal processing means, each microlens ($L_i$) defining a subaperture ($SP_i$), indexed, and focusing a surface element of the wavefront, intercepted by the said subaperture, to form a spot ($T_i$) on the detector supplying a signal, a zone ($Z_i$) of assumed localization of the spot on the detector being defined for each subaperture, a stage of processing of the signal supplied by the detector making it possible in particular to establish a measurement file (35) associated in particular with each subaperture in the localization zone of which a spot is detected, the position of this spot, each subaperture being referenced by its index, the method being characterized in that it includes in addition:

prior choice (30) of an array (ML) of microlenses exhibiting at least one local variation of its structure, a preliminary stage (31) of characterization of this array making it possible to establish a reference file (32) in particular associating with each subaperture, referenced by its index, the position of the spot originating from the said subaperture when the subaperture is illuminated by a known wavefront, the file data including a contribution due to the local variation of the structure of the array, during each analysis (33) of a wavefront, establishment of the measurement file (35), the file data also including a contribution due to the local variation of the array structure, comparison (36) of the said contributions taken from each of the two files, this comparison making it possible to determine any displacement (37) in number of subapertures between these two contributions and deduce therefrom, with certainty, the correspondence between a detected spot and the subaperture from which it originated, knowing this correspondence, on the basis of the measurement file and the reference file, calculation (38) of the average slope of the wavefront on each surface element intercepted by each subaperture illuminated by the wavefront.

2. A method according to claim 1, characterized in that the reference file (32) only includes a contribution due to the local variation and in that the contribution due to the local variation in the measurement file is obtained by application, to the said file, of high-pass filtering (361) adapted to the said variation, the displacement (37) between the two contributions then being determined by comparison (363) of the reference file (32) and of the measurement file after filtering (362).

3. A method according to claim 1, characterized in that the contributions due to the local variation in the measurement file and in the reference file are obtained by application, to the two files of the same high-pass filtering (361), the displacement (37) between the two contributions being determined by comparison (363) of the two files after filtering (362, 364).

4. A method according to claim 2, characterized in that the phase of the wavefront to be analysed being resolvable on a base of known polynomials, the high-pass filtering (361) applied to a file consists of subtracting, from this file, the contributions due to a given number of these polynomials.

5. A method according to claim 3, characterized in that comparison (363) of the files after filtering is carried out by means of a correlation operation.

6. A method according to claim 1, characterized in that comparison (36) is carried out by applying, to one of the two files (32, 35), a hypothetical value of displacement, effecting a subtraction between the file thus obtained and the other file, and iterating the displacement value applied so as to determine for what value of displacement, the contribution due to the local variation in the file resulting from the subtraction is the smallest.

7. A method according to claim 1, characterized in that it comprises in addition a stage (39) of reconstruction of the phase of the wavefront, making it possible in particular to determine the exact value of the deflection of the wavefront.

8. A device for wavefront analysis comprising in particular an array (ML) of microlenses ($L_i$), a detector (DET) and signal processing means, each microlens ($L_i$) defining a subaperture ($SP_i$), indexed, and focusing a surface element of the wavefront, intercepted by the said subaperture, to form a spot ($T_i$) on the detector supplying a signal, a zone ($Z_i$) of assumed localization of the spot on the detector being defined for each subaperture, the processing means making it possible to process the signal supplied by the detector in order in particular to establish a measurement file (35) associating in particular, with each subaperture in the localization zone from which a spot is detected, the position of this spot, each subaperture being referenced by its index, the device being characterized in that:

its array (ML) of microlenses has at least one local variation of its structure, this array being characterized beforehand so as to establish a reference file (32) associating in particular, with each subaperture, referenced by its index, the position of the spot originating from the said subaperture when the subaperture is illuminated by a known wavefront, the file data including a contribution due to the local variation of the structure of the array, the measurement file (35) also includes a contribution due to the local variation of the structure of the array, the processing means permit in addition establishment of the measurement file (35), the file data also including a contribution due to the local variation of the structure of the array, comparing the said contributions taken from each of the two files, this comparison making it possible to determine any displacement (37) in number of subapertures between these two contributions and deduce therefrom, with certainty, the correspondence between a detected spot and the subaperture from which it originated, knowing this correspondence, on the basis of the measurement file and of the reference file, calculation of the average slope of the wavefront on each surface element intercepted by each subaperture illuminated by the wavefront.

9. A device according to claim 8, characterized in that at least one local variation of the structure of the array is an uncontrolled defect of the array due to the non-reproducibility of the method of manufacture of the array.

10. A device according to claim 8, characterized in that at least one local variation of the structure of the array is a controlled variation, introduced during manufacture of the array.

11. A device according to claim 8, characterized in that the general form of the frequency distribution of the slopes of the wavefront being known, local variations are introduced into the structure of the array in such a way that the frequency distribution of the contribution due to these local variations is adapted to the said general form.

12. A device according to claim 8, characterized in that at least one local variation of the structure consists of a difference in the position of one or more adjacent microlenses, the contributions taken from each of the two files to be compared (36) being the contributions due to the local variation in the positions of the spots.

13. A device according to claim 8, characterized in that at least one local variation of the structure consists of a variation in transmission of one or more adjacent microlenses, the files (32, 35) in addition associating with each subaperture, the intensity of the spot originating from the said subaperture, the contributions taken from each of the two files to be compared (36) being the contributions due to the local variation in the intensities of the spots.

* * * * *